(12) United States Patent
Jasra et al.

(10) Patent No.: US 6,790,424 B2
(45) Date of Patent: Sep. 14, 2004

(54) PROCESS FOR GENERATION OF PRECIPITATED CALCIUM CARBONATE FROM CALCIUM CARBONATE RICH INDUSTRIAL BY-PRODUCT

(75) Inventors: Raksh Vir Jasra, Gujarat (IN); Pravinchandra M. Oza, Gujarat (IN); Rajesh S. Somani, Gujarat (IN); Jatin R. Chunnawala, Gujarat (IN); Mrinal V. Sheth, Gujarat (IN); Vikram V. Thakkar, Gujarat (IN); Yogi M. Badheka, Gujarat (IN); Jayalekshmy Ayyer, Narmadanagar (IN); Virendra B. Patel, Narmadanagar (IN)

(73) Assignees: Council of Scientific and Industrial Research, New Delhi (IN); Gujarat Narmada Valley Fertilizer Company Limited, Gujarat (IN)

( * ) Notice: Subject to any disclaimer, the term of this patent is extended or adjusted under 35 U.S.C. 154(b) by 83 days.

(21) Appl. No.: 09/998,968

(22) Filed: Oct. 31, 2001

(65) Prior Publication Data

US 2003/0082091 A1 May 1, 2003

(51) Int. Cl.$^7$ ................................................. C01F 11/18

(52) U.S. Cl. ........................................ 423/274; 423/432
(58) Field of Search ................................. 423/274, 432, 423/430, DIG. 3; 106/465

(56) References Cited

U.S. PATENT DOCUMENTS 5,413,635 A * 5/1995 Matweecha et al. ........ 106/792

* cited by examiner

*Primary Examiner*—Stuart Hendrickson
(74) *Attorney, Agent, or Firm*—Drinker Biddle & Reath LLP (57) ABSTRACT

An environmentally friendly process for the production of precipitated calcium carbonate suitable for industrial application from a calcium carbonate-rich by-product of a nitrophosphate fertilizer plant. The process employs purification steps of calcination, carbonation and optional treatment with an emulsion of fatty acid or fatty acid derivatives.

7 Claims, 1 Drawing Sheet

FIG. 1

PROCESS FOR GENERATION OF PRECIPITATED CALCIUM CARBONATE FROM CALCIUM CARBONATE RICH INDUSTRIAL BY-PRODUCT

FIELD OF THE INVENTION

The present invention relates to a process for the production of precipitated calcium carbonate from a calcium carbonate-rich by-product generated in an industrial process, specifically, a by-product generated by a nitrophosphate plant in the fertilizer industry.

BACKGROUND OF THE INVENTION

Precipitated calcium carbonate finds varied commercial uses, including the manufacture of paper, rubber, plastics, glass, textiles, putties, chalks, sealant, adhesives, paints, inks, varnishes, food, cosmetics, dentrifices, chemicals and pharmaceuticals.

Commercial applications of precipitated calcium carbonate require well-defined powder characteristics, particularly, fine particles with a narrow size distribution, uniform shape and crystallinity. Marentette J. M. et al. ("Crystallization of Calcium Carbonate in the presence of PEO-block-PMAA copolymers", Adv. Mater., 9, 647, 1997) have shown that these characteristics play a crucial role in product properties and that their control is important for the preparation of industrially useful products. Precipitated calcium carbonate must also be substantially free of impurities to be useful for various commercial applications. Several physical and chemical processes have been reported for the treatment of solid waste containing calcium carbonate.

Physical processes require drying and grinding to a fineness that allows impurities to be removed by screening, classification, magnetic separation, hydrocyclone and floatation separation. The disadvantages of these physical methods include the requirement of special equipment and the required maintenance thereof. Other disadvantages of existing processes include unpredictable process efficiencies, variable results in the quantities of impurities removed and the expenses associated with employing such physical techniques.

Chemical processes for the purification of calcium carbonate-rich waste involve leaching or bleaching of impurities using special reagents. Disadvantages of these methods include the requirement of a number of unit operations to perform the treatment. Moreover, a single chemical process may not be suitable for removal of all the impurities. Removal and separation of excess chemical reagents after the treatment is another disadvantage.

Another previously known and widely used method for the treatment of calcium carbonate-rich waste is reburning within the kiln and removing the reburned waste after cooling to obtain calcium oxide. The calcium oxide is then recycled in a causticizing process in producing paper pulp or it is subjected to hydration followed by carbonation to produce precipitated calcium carbonate.

In the process of Richard Woode (U.S. Pat. No. 4,018,877), an aqueous suspension of calcium hydroxide at 25° C. was agitated vigorously and reacted with a mixture of air and carbon dioxide. After 15 minutes (following the 'primary nucleation stage') a complex-forming agent, such as a hydroxy carboxylic acid, particularly a hydroxy polycarboxylic acid (, e.g., citric acid and malic acid) which complexes calcium ions. The complexing agent was added in a concentration range of 0.001 to 5 wt. %, preferably in the range 0.03 to 0.2 wt. % based on the weight of the calcium carbonate produced. The carbonation was stopped after about 50 minutes when the reaction mixture had just become acid to a phenolphthalein indicator. The mixture was then heated to 85° C. over a period of 20 minutes and was allowed to age for 30 minutes. Carbonation was restarted at a much lower rate, maintaining the temperature at 85° C. After 20 to 40 minutes the pH of the batch had fallen below 8.0. At this stage, 0.8% stearic acid in ammonia solution was added and the mixture was stirred at 85° C. for about 3 hours. The suspension was filtered. The filter cake was extruded through 5/16 inch diameter holes to yield "granules" which were dried in an oven overnight at 130° C. on a gauze-tray to produce calcium carbonate having 0.72 relative granule hardness and 0.07 micron ultimate particle size with a soft texture. The drawbacks of this process are that the total batch/production time is more than 5 hours during which time the temperature is maintained at 85° C. for a period of 4 hours. In addition, the process requires drying of the product overnight at 130° C. This process is thus highly energy consuming and is therefore unattractive.

Hiroji Shibazaki et al. (U.S. Pat. No. 4,133,894), disclose that precipitates of uniform particle size can be continuously produced by repeating the step of carbonation reaction. In the first step of the process, a suspension of calcium hydroxide having a solids concentration 0.1 to 10 weight % and a temperature of 15 to 30° C. is sprayed in the form of droplets of about 0.2 to 1.0 mm in diameter against a gas containing 10 to 40 volume % carbon dioxide in countercurrent contact therewith. The gas is passed at a specified superficial velocity of about 0.02 to 0.5 m/sec. By this process, 5 to 15% of the calcium hydroxide is converted to calcium carbonate. In the second step of this process, the suspension resulting from the first step is sprayed in the form of droplets of about 1.0 to 1.5 mm diameter against a gas containing 15 to 35 volume % of carbon dioxide and passed upward through the column at a superficial velocity of about 1.5 to 2.5 m/sec whereby growth of crystals is accomplished. In the third step of this process, the suspension resulting from second step is sprayed at a temperature of up to 30° C. in the form of droplets of about 1.5 to 2.0 mm in diameter into a column in countercurrent contact at a superficial velocity of about 1.5 to 3.0 m/sec whereby the carbonation is completed. Thus, superfine calcium carbonate having an average particle size of less than about 0.1 to 3.0 microns is produced. The main drawback of this process is that it requires control of number of parameters such as solids concentration, droplet size, temperature of suspension, gas velocity of carbon dioxide containing gas etc. for three columns. Another drawback is the requirement of multi-step carbonation which is more expensive in terms of operating cost for columns and pumps than a single stage carbonation.

Bleakley, Ian S. et al. (U.S. Pat. No. 5,342,600) describe a method of preparing precipitated calcium carbonate which comprises: (1) slaking quick lime in an aqueous medium, (2) subjecting the aqueous medium to continuous agitation during said slaking, (3) passing a suspension of calcium hydroxide obtained after slaking through a sieve having an aperture size of 40–70 microns, (4) subjecting the suspension to high energy high shear agitation with an impeller having a peripheral speed of 40–70 m/sec., so as to obtain finely dispersed calcium hydroxide, (5) terminating the said high energy high shear agitation on achieving finely dispersed slaked lime, (6) carbonating the finely dispersed slaked lime by passing therethrough sufficient gas comprising carbon dioxide to neutralize the pH of the suspension during said carbonation step, (7) subjecting the suspension to continuous agitation with an impeller speed of 200–700 cm/sec to maintain the suspension, and (8) separating the precipitated calcium carbonate formed in the process. The disadvantage associated with this method is requirement for generating high energy high shear agitation during slaking and carbonation.

The use of additives to control the morphology and particle size is also reported. Bleakley Ian S. et al. (U.S. Pat. No. 5,558,850) disclose a process wherein 0.1 to 2.0% by weight of a reagent having one or more active hydrogen atoms e.g., polyhydric alcohol or phenol is added to the aqueous medium in which the quick lime is slaked. Chapnerkar Vasant D. et al. (U.S. Pat. No. 5,332,564) disclose a process wherein quicklime is slaked in an aqueous solution containing about 0.1 to 2.0%, by weight of a sugar for the production of rhombic shaped precipitated calcium carbonate. Bleakley Ian S. et al. (U.S. Pat. No. 5,232,678), disclose a process wherein 0.01 to 1.5% by weight of triethanolamine, mannitol, morpholine and solid borohepthonate are employed in the preparation of clusters of calcium carbonate which give good light scattering properties when used as a paper filler or paper coating pigment. Vanderheiden, Denis B. (U.S. Pat. No. 4,714,603) discloses the use of polyphosphates in an amount of 0.1 to 1.0% by weight for generating precipitated calcite of substantially spherical morphology suitable for use in dull finish coated paper. The disadvantage associated with all these processes is the requirement of special reagents which add to the production cost.

Bleakley Ian S. et al. (U.S. Pat. No. 5,833,747), disclose a method for preparing precipitated calcium carbonate for use as a pigment in paper coating compositions. The method comprises the steps of (1) carbonating an aqueous medium containing lime, (2) at least partially dewatering the precipitated calcium carbonate-containing suspension using a pressure filter device operating at a pressure of 5 to 10 MPa and (3) subjecting the precipitated calcium carbonate-containing suspension to comminution by high shear attrition grinding with an attrition grinding medium such as silica sand having a median particle diameter in the range 0.1 to 4.0 mm. The product predominantly comprises aragonitic or scalenohedral crystals. The disadvantages of this method include the requirement of a device for high shear attrition grinding with a special grinding medium and a pressure filter device for dewatering the precipitated calcium carbonate containing suspension. Also, the grinding medium is not separated during the process.

Kroc Vicki J. et al., disclose a process (U.S. Pat. No. 5,695,733) that comprises the steps of (1) forming a reaction mixture containing seed material of a scalenohedral particles of aragonite type calcium carbonate and (2) adding lime slurry into the reaction mixture while simultaneously introducing carbon dioxide. The flow rates of the lime slurry and carbon dioxide are adjusted to control the solution conductivity of the reaction mixture to from 2 to 4 milli Siemens to form the clusters of calcite particles. The drawback of this process is that it requires simultaneous addition of lime slurry and carbon dioxide to maintain the solution conductivity. Moreover, simultaneous control of flow rates of both liquid phase and gaseous phase reactants is difficult.

You Kyu Jae discloses a process for producing calcium carbonate particles having an average size of 0.1 to 1.0 micron (U.S. Pat. No. 5,811,070). The process comprises the following steps. (1) Carbon dioxide is introduced into a milk of lime containing a first reagent, consisting of sodium glutamate, sugar, or a mixture thereof, to prepare an aqueous suspension containing calcium carbonate particles of 0.4 micron in average size. The concentration of the first reagent is from 0.1 to 2.0 parts per 100 parts of calcium hydroxide initially present in the milk of lime. (2) A milk of lime is added into the above aqueous suspension. (3) A carbonated solution is added to the aqueous suspension, which contains a second reagent comprising at least one of sodium polyacrylate and a bicarbonate in the range of 0.1 to 5.0 parts per 100 parts of calcium hydroxide present initially, Calcium carbonate particles produced by the process are suitable as a filler for adhesives, paints, inks, papers and plastics, especially transparent polyethylene films. The drawback associated with this process is the addition of two different types of reagents in two stages, which makes the process complicated and unattractive.

Vanderheiden discloses a process (U.S. Pat. No. 4,367,207). for preparing finely divided precipitated calcite. In the Vanderheiden process, carbon dioxide is introduced into an aqueous calcium hydroxide slurry containing anionic organo-polyphosphate polyelectrolyte at a temperature from about 7° C. to about 18° C. One disadvantage of this process is the requirement of an anionic polyelectrolyte which adds to the production cost. Another disadvantage is the required maintenance of a reaction temperature below ambient temperature. This requirement necessitates a chilling plant which is energy consuming.

SUMMARY OF THE INVENTION

The present invention provides a process for the production of precipitated calcium carbonate from calcium carbonate-rich by-product generated in a chemical processing industry which process obviates the drawbacks detailed above. Precipitated calcium carbonate is produced by calcination of calcium carbonate-rich by-product into quick lime in a kiln. This is followed by slaking or hydration to obtain hydrated lime. The hydrated lime is subsequently subjected to carbonation.

The present invention also develops an alternative to limestone as a source for producing precipitated calcium carbonate useful for commercial applications.

The present invention also develops a process for purification, calcination, slaking and carbonation of a calcium carbonate-rich by-product having particle size from 20 to 150 microns to produce precipitated calcium carbonate of particle size less than 20 microns.

The present invention also provides a continuous process for the purification of a calcium carbonate rich by-product of a nitrophosphate fertilizer plant thereby minimizing solid waste produced by such a plant.

The present invention also provides pollution abatement measure for a nitrophosphate fertilizer plant by utilizing the calcium carbonate-rich by-product generated in such a plant.

The present invention also produces from calcium carbonate rich by-product generated in a nitrophosphate fertilizer plant, a high-value finely divided precipitated calcium carbonate which is useful as a filler in paints, and in plastics, rubber, poly vinyl chloride (PVC) and paper.

The present invention relates to a process for the production of precipitated calcium carbonate from calcium carbonate-rich by-product generated in industrial processes, specifically from a nitrophosphate plant in the fertilizer industry. In one embodiment, the steps of the process comprise:

(1) calcinating a calcium carbonate rich by-product generated in a nitrophosphate fertilizer plant, the by-product having a moisture content up to 25% and a particle size from 20 to 150 microns, in a rotary calciner at a continuous feed rate from 5 to 20 kg/h at a calcination temperature of above 850° C. and below about 950° C. with a residence time from 60 to 90 minutes, to obtain a calcined material having from 75 to 88% available calcium oxide;

(2) removing water vapor, volatile matter, ammonia, $NO_x$ and carbon dioxide during the calcination using a blower and a scrubber;

(3) slaking the calcined material (calcium oxide) in a slaker provided with an agitator rotating at 120 RPM to produce a hydrated lime slurry having a solids concentration in the range from 15 to 23% by weight;

(4) removing heavier and coarse particles from the hydrated lime slurry by wet sieving through a 60 to 100 mesh sieve to form a fine hydrated lime slurry;

(5) diluting the fine hydrated lime slurry to a solids concentration from 10 to 20% by weight;

(6) transferring the diluted lime slurry to a carbonation tower and passing a carbon dioxide-air mixture containing 25% by volume carbon dioxide at a superficial gas velocity of from 10 to 15 cm/sec at a maintained temperature from 25 to 45° C. until the pH of the diluted lime slurry is lowered to near neutral;

(7) separating the precipitates formed in step (6) by known methods, e.g., filtration or centrifugation;

(8) drying and pulverizing the separated precipitates to produce a precipitated calcium carbonate; and (9) optionally, treating the product slurry before the separation with a fatty acid or a salt of a fatty acid such as, for example, stearic acid or sodium stearate at 95° C. in a concentration range from 2 to 3.5% so as to obtain a coated precipitated calcium carbonate which is industrially useful in a number of applications such as rubber, plastics, paints and PVC.

The invention is further directed to a precipitated calcium carbonate product having a mean particle size from about 4 to 6 microns wherein 100% of the particles are less than 20 microns and having a weight percent of calcium carbonate greater than 97.

The process described herein significantly purifies a calcium carbonate-rich by-product generated in a nitrophosphate fertilizer plant to produce precipitated calcium carbonate.

Figure 1:
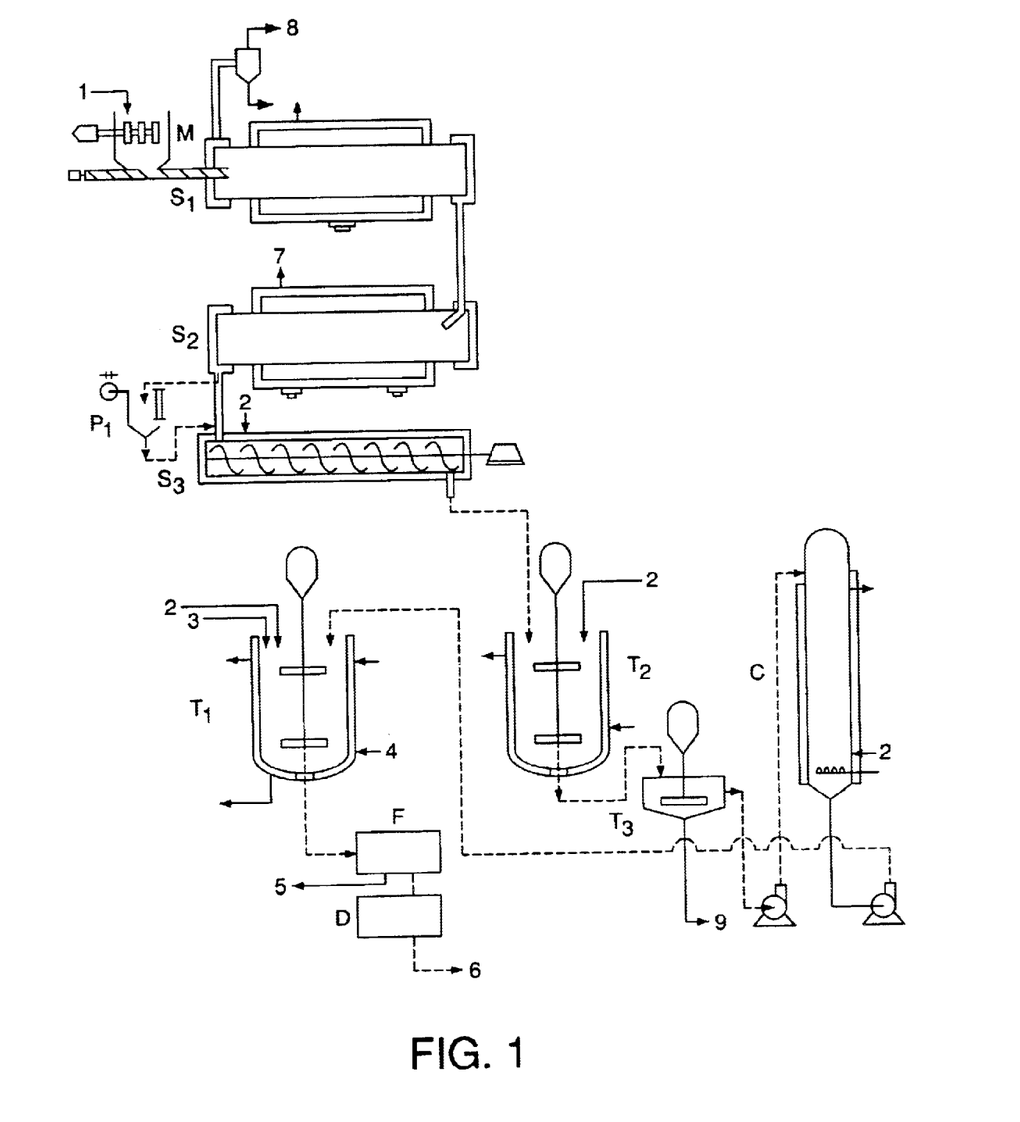
FIG. 1 represents the apparatus used for the calcination and production of precipitated calcium carbonate from a calcium carbonate-rich by-product generated in a nitrophosphate fertilizer plant.

The apparatus comprises the following components:

M-paddle mixer cum screw feeder,
$S_1$-Indirect rotary dryer,
$S_2$-Indirect rotary calciner,
$S_3$-Jacketed Cooler,
$P_1$-Jaw crusher,
$T_1$-Slurry tank;
$T_2$-lime slaker,
$T_3$-sedimentation tank,
C-Carbonation tower with sparger,
F-Filtration unit, pressure or rotary vacuum type and
D-Flash dryer.

The numbers 1 to 9 in FIG. 1 indicate the following:
1. Calcium carbonate rich by-product, i.e., Feed material.
2. Water
3. Coating agent solution
4. Steam
5. Filtrate
6. Product
7. Flue gases
8. Exhaust gases
9. Grit/sediments.

DETAILED DESCRIPTION OF THE INVENTION

The present invention provides a process for the production of precipitated calcium carbonate from calcium carbonate-rich by-product generated in industrial processes, specifically from nitrophosphate fertilizer plants. The process of the invention comprises feeding a wet calcium carbonate-rich by-product containing up to 25% moisture and having particle size from 20 to 150 microns, continuously into a calciner. The calciner is maintained at a temperature from 850° to 950° C. The calciner is operated with an angle of inclination of 1.08 degrees and a shell rotation speed from 0.5 to 2 RPM. The calcium carbonate-rich by-product is added to the calciner at a feed rate from 5 to 20 kg/h. The calciner is further provided with the means to remove liberated water vapors, carbon dioxide, ammonia and $NO_x$-containing exhaust gas into a scrubber wherein ammonia and $NO_x$ gases are scrubbed with water. The calciner is further provided with a means to move the calcined outlet material exiting the calciner after residence time of about 30 to 90 minutes, and exiting the calciner at the outlet rate of 2.5 to 6 kg/h, to a crusher (e.g. a Jaw crusher). The crusher crushes the calcined material to form small lumps. The crushed calcined material is cooled to a temperature from 40 to 50° C., and slaked with water in a slaker which is provided with an agitator, to produce a hydrated lime slurry having a concentration from 15 to 23% solids by weight. The hydrated lime slurry is processed by removing heavier and coarser particles by sedimentation and/or wet sieving through a 60 to 100 mesh sieve. The processed hydrated lime slurry is then diluted to a desired concentration from 10 to 20% solids by weight. The diluted slurry is then taken up in a carbonation reactor and a carbon dioxide-air mixture is passed through the slurry. The carbon dioxide-air mixture contains 25% by vol. carbon dioxide and is passed through the slurry at a gas velocity from 10 to 15 cm/sec., at a maintained temperature from 25 to 45° C. The carbon dioxide-air mixture is passed through the slurry until the pH of the slurry has fallen to near neutral. Material that precipitates during the carbonation is then separated by known methods, e.g. by filtration or centrifugation The separated material is dried and pulverized to produce precipitated calcium carbonate. Optionally, the slurry is treated before filtration with a fatty acid derivative such as sodium stearate in a concentration range from 2.0 to 3.5% by weight for 10 minutes at 95° C. The treated slurry is then allowed to cool to below 50° C. with continuous stirring to produce coated calcium carbonate. The slurry of coated calcium carbonate thus produced is then separated using known methods. The separated material is then dried and pulverized to produce coated calcium carbonate.

In one embodiment of the present invention, calcium carbonate-rich by-product having a moisture content up to 25% may be used as a starting material. This provides the special advantage of using calcium carbonate-rich by-product as it is generated in the nitrophosphate fertilizer plant or as it is stored for a longer period in silos. Therefore, the process provided by the present invention can be linked to the nitrophosphate fertilizer plant. The process of the invention may thereby be made continuous with the production of calcium carbonate-rich by-product by the nitrophosphate fertilizer plant.

In another embodiment of the present invention, a calcium carbonate-rich by-product of a nitrophosphate fertilizer plant can be utilized on a continuous basis to obtain quick lime, slaked lime and/or subsequently precipitated calcium carbonate for commercial applications.

In yet another embodiment of the present invention, the whiteness brightness, lightness, fineness, oil absorption, alkalinity and purity are improved by the present invention.

In yet another embodiment of the present invention, moisture up to 25%, volatile matter from 7 to 8% and ammonium compounds from 0.1 to 0.3% (as ammonical Nitrogen) present in a calcium carbonate-rich by-product are removed.

In yet another embodiment of the present invention, nitrate impurities in the range from 0.05 to 0.1% (as nitrate Nitrogen) are removed from a calcium carbonate-rich by-product generated in a fertilizer plant.

In yet another embodiment of the present invention, the material outlet rate from the calciner may be adjusted in a range from 2 to 6 kg/h by varying the rotation speed of the canciner from 0.5 to 2 RPM at the angle of inclination of 1.08°.

In yet another embodiment of the present invention, the calcination of calcium carbonate-rich by-product may be carried out at a temperature above 850° C. and below 950° C. to obtain a calcined material having from 75 to 88% available CaO.

In yet another embodiment of the present invention, the cooled and crushed calcined material may be slaked in water to obtain a hydrated lime slurry having from 15 to 23% solids in suspension.

In yet another embodiment of the present invention, the hydrated lime slurry may be diluted to a desired concentration in the range from 10 to 20% by weight solids and then wet sieved through a 60 to 100 mesh sieve to remove grit particles.

In yet another embodiment of the present invention, the hydrated lime slurry is subjected to carbonation in a bubble column reactor equipped with a suitable sparger and using a carbon dioxide-air mixture having a carbon dioxide concentration of 25% by volume.

In yet another embodiment of the present invention, the carbonation may be accomplished by passing the mixed gas at a rate of from 10 to 15 cm/sec and maintaining the temperature in the range from 25 to 45° C. to achieve a neutral pH within from about 60 to 140 minutes.

In yet another embodiment of the present invention, the precipitated calcium carbonate formed in the process may be coated with a fatty acid derivative to obtain from 2 to 3% total fatty acid derivative in the final product.

In yet another embodiment of the present invention, the purity of the calcium carbonate-rich by-product is improved from 88–90% to 97–99% by producing the precipitated calcium carbonate.

Calcium carbonate-rich by-product generated in industrial processes, specifically in a nitrophosphate fertilizer plant, may comprise from 88 to 90% $CaCO_3$, from 0.2 to 0.4% total nitrogen, from 0.1 to 0.3% ammonical nitrogen, from 0.05 to 0.1% nitrate nitrogen, from 1.0 to 1.5% phosphate as $P_2O_5$, from 0.2 to 0.25% fluoride as F, from 3.5 to 4.0% mixed oxides (aluminum, iron, phosphates and matter insoluble in HCl), from 7 to 8% volatile matter, from 43 to 45% loss on ignition, from 0.1 to 0.15% soluble alkali as $Na_2O$ and from 1.0 to 1.2% acid insoluble matter. Other properties of the by-product include the following. The pH of a 5% aqueous suspension is from 9 to 9.3, the tapped bulk density is from 1.30 to 1.35 g/mL, the brightness/whiteness is 85% and the particle size is from 20 to 150 microns.

Attempts were made to purify a calcium carbonate-rich by-product by methods known in the prior art. Physical methods such as sieving, floatation, sedimentation and hydrocyclone separation were not successful. The failure of prior art processes suggested that the impurities present in the calcium carbonate-rich by-product are an integral part of the material and not physically separate as in case of the conventional raw material, limestone. Conventional chemical treatment methods were also found not suitable, because the chemicals used were unable to leach the entrapped impurities from the calcium carbonate-rich by-product.

Therefore, it was decided to calcine the calcium carbonate-rich by-product to obtain calcium oxide. When the calcium carbonate-rich by-product was heated to 900° C. for one hour, the percent weight loss was 47.1% by weight and the X-Ray diffraction analysis indicated the presence of only calcium oxide. Therefore, it was inferred that some of the impurities can be removed by calcination of a calcium carbonate-rich by-product, which by-product can be subjected to hydration and carbonation to obtain precipitated calcium carbonate.

Therefore, in the present invention, a process is developed for the production of precipitated calcium carbonate from a calcium carbonate-rich by-product generated in industrial processes, specifically from a nitrophosphate fertilizer plant. The process comprises feeding continuously a wet calcium carbonate-rich by-product containing up to 25% moisture and having a particle size in the range from 20 to 150 microns into a calciner maintained at above 850° C. and below 950° C., at a feed rate from 5 to 20 kg/h. The residence time of the material in the calciner is varied from 30 to 90 minutes by varying the rotation speed of the calciner from 0.5 to 2 RPM at an angle of inclination of 1.08 degrees. The calciner is provided with the means to remove liberated water vapor, carbon dioxide, ammonia and $NO_x$-containing exhaust gas into a scrubber, wherein ammonia and $NO_x$ gases are scrubbed with water. The outlet rate of the calcined material varied from 2 to 10 kg/h. The calcined mass coming out is in a big lump form. Therefore, the calcined material is passed through a jaw crusher fitted between the calciner and a material cooler. The crusher serves to crush the calcined material into small lumps. The outlet material from the crusher is passed through a screw conveyer type material cooler equipped with a circulating water jacket. The material cooler serves to cool the small lumps to near ambient temperature (from 40 to 50° C.). Slaking of the calcined material obtained from the material cooler is carried out with water for one hour in a slaker provided with an agitator which rotates at 120 RPM to produce a hydrated lime slurry having a concentration from 15 to 23% by weight. Impurities present in the form of heavier and coarser particles were removed by sedimentation and/or by wet sieving through a 60 to 100 mesh sieve. The resulting slurry, from which the heavier/coarser particles have been removed, is diluted to a desired concentration in the range from 10 to 20% by weight and then transferred into a carbonation reactor provided with a sparger. Carbonation is accomplished by passing a carbon dioxide-air mixture containing 25% by volume carbon dioxide, at a gas velocity from 10 to 15 cm/sec. and maintaining the temperature in the range from 25 to 45° C. until the pH of the slurry falls to near neutral. Then the precipitated material formed is separated by known methods. The separated solids are then dried and pulverized to obtain precipitated calcium carbonate.

Optionally, the product slurry was treated with an emulsion or solution of a fatty acid derivative at 95° C. to obtain from 2 to 3.5% by weight total fatty acid derivative in a coated calcium carbonate. The solids were recovered by known methods of filtration, drying and pulverizing to obtain the coated calcium carbonate. The properties of precipitated calcium carbonate and coated precipitated calcium carbonate are given in Table 1. These properties indicated that the products would be useful as filler in paints, plastics, rubber and PVC.

TABLE 1

| Sr. No. | Properties | Precipitated | Coated |
|---|---|---|---|
| 1 | $CaCO_3$, (by Acidimetry), % weight, Min. | 97 | 95 |
| 2 | pH (5% slurry) | 10–11 | 9.5–10.5 |
| 3 | Total Nitrogen, % weight | Not traceable | Not traceable |
| 4 | Ammonical Nitrogen, % weight | Not traceable | Not traceable |
| 5 | Nitrate Nitrogen, % weight | Not traceable | Not traceable |
| 6 | Phosphate as $P_2O_5$, % weight | less than 1.0 | less than 0.1 |
| 7 | Mixed oxides, % weight | 2.0–3.0 | 1.50–2.5 |
| 8 | Fluoride as $F^-$, % weight | 0.04 | 0.02 |
| 9 | Bulk density, tapped, g/mL | 0.40–0.45 | 0.35–.40 |
| 10 | Oil absorption, % weight | 60–100 | 80–100 |
| 11 | Whiteness/Brightness % | 96–98 | 97–99 |
| 12 | Particle size, microns | less than 20 | less than 20 |
| 13 | Total Fatty acid derivative, % weight | NIL | 2.5–3.0 |

The percent available CaO in the calcined material was determined by the Sugar method. This method involved adding a known weight of the sample in a 15% sugar solution and allowing the sample to dissolve for 3 hours. The resulting solution was then filtered to remove undissolved solids. An aliquot of the filtrate was then titrated with a standardized acid.

The product properties were determined by methods that are described as follows.

The calcium carbonate content of the product was determined by adding an accurately weighed sample (approximately 2 g) to a known volume of standard acid. The sample was allowed to react completely. The unreacted acid was then titrated with a standardized alkali solution. Mixed oxides were determined by precipitating hydroxides from an acidic solution of the sample. The precipitated hydroxides were then ignited and weighed as the corresponding oxides. Phosphates were determined by a spectrophotometric method. Ammonical nitrogen, nitrate nitrogen and fluoride were determined by ion-selective electrodes. Tapped bulk density was measured by noting the volume of material after tapping a known weight of the sample 50 times in a calibrated cylinder. Whiteness/brightness was measured by measuring the reflectance of the sample and comparing with the reflectance of magnesium carbonate (considered as 100% whiteness) and with the reflectance of carbon black (considered as zero percent whiteness). The particle size was determined using Mastersizer-2000 (Malvern, UK), particle size analyzer on the dry powder. The total content of fatty acid derivative in the coated precipitated calcium carbonate was determined by extracting the coated material with absolute alcohol, separating the same and evaporating the solvent to isolate the coating material as a residue.

The process for the production of precipitated calcium carbonate according to the present invention, uses a new kind of raw material which is a by-product generated in a nitrophosphate fertilizer plant. This raw material has hitherto not been used for this purpose. This raw material has a particle size in the range from 20 to 150 microns and contains various types of impurities not usually found in the conventionally employed raw material, limestone. Considering the scientific knowledge about the type of impurities present in a calcium carbonate-rich by-product, it was possible to find out the data for such a material with regard to its, decomposition or sublimation temperature. This information is described below.

Moisture can be removed from the calcium carbonate-rich by-product by drying the material at 105–100° C. for a sufficient period. Ammonium carbonate decomposes at 58° C. Ammonium bicarbonate decomposes between 36 and 60° C. and sublimes. Ammonium nitrate decomposes at 210° C. Ammonium chloride and ammonium fluoride sublime at 335° C.

Calcium nitrate (anhydrous) melts at 561° C. Calcium nitrate trihydrate melts at 51.5° C. Calcium nitrate tetrahydrate decomposes at 132° C. Calcium mono- and di-phosphates decompose below 205° C., whereas calcium tri- and pyro-phosphate melt above 1200° C. Calcium hydroxide is converted to CaO and water between 580 and 600° C.

Aragonite-type calcium carbonate decomposes at 825° C., whereas calcite type calcium carbonate decomposes at about 895° C. Both aragonite and calcite decompose to form calcium oxide and carbon dioxide. If calcium carbonate is heated above 1000° C., it forms dead burnt/inactive calcium oxide and liberates carbon dioxide. It is also known that active calcium oxide can be slaked to obtain hydrated lime which can be further carbonated to produce precipitated calcium carbonate.

The advantages involved in the claimed process include:

Using a raw material without pre-drying or crushing.

Keeping the material in free-flowing conditions throughout the processing.

Removal of the chemical impurities during calcination.

Improving brightness without using any special reagent.

Calcination of very fine (from 20 to 150 micron) and highly dense (bulk density 1.3 to 1.35 g/mL) particles with minimum dusting.

Avoiding the requirement of special types of material for construction of the calciner by limiting the calcination temperature to below 1000° C.

Limiting the effect of calcination to removal of impurities without forming the dead burnt lime.

Means for scrubbing liberated gases to avoid pollution of the surrounding environment.

The following examples are given by way of illustrations and therefore should not be construed to limit the scope of the present invention.

EXAMPLE 1

A calcium carbonate-rich by-product generated in a nitrophosphate fertilizer plant, having 12% moisture, was dried to a moisture content of <1% in a rotary dryer. The dried calcium carbonate-rich by-product was fed at the rate of 10 kg/h into a rotary calciner. The rotory calciner was preheated to 875° C. with an angle of inclination 1.08 and a shell rotation speed of 1.5 RPM. The hold-up time was 35 minutes and the outlet rate was 5.2 kg/h. The product material was found to have 37% by wt. available CaO indicating incomplete calcination.

EXAMPLE 2

A calcium carbonate-rich by-product generated in a nitro-phosphate fertilizer plant, having 12% moisture was dried to a moisture content of <1% in a rotary dryer. The dried calcium carbonate-rich by-product was fed at the rate of 10 kg/h into a rotary calciner. The calciner was preheated to 875° C. with an angle of inclination of 1.08 degrees and a shell rotation speed of 0.75 RPM. The hold-up time of the material in the calciner was 60 minutes and the outlet rate was 5.10 kg/h. The calcined mass obtained thereby was found to have 75% available CaO. The calcined material was crushed into small lumps. The crushed calcined material was subjected to slaking for a period of one hour in a slaker so as to obtain a suspension having about 20% by weight solids. The suspension was wet sieved through a 100 mesh sieve to remove grit particles. The sieved material was diluted to obtain a slurry containing about 10% solids. This slurry was subjected to carbonation by passing through the slurry a carbon dioxide-air mixture containing 25% by volume carbon dioxide at a superficial gas velocity of about 12.5 cm/sec. The temperature of the carbonation was maintained in the range from 25 to 45° C. until the pH of the suspension dropped to near neutral. The carbonation was completed within about 90 minutes. Thereafter, the product was recovered by known methods. The product contained about 80% calcium carbonate, with a bulk density of about 0.50 g/mL and an average particle size of above 10 microns.

EXAMPLE 3

A calcium carbonate-rich by-product generated in a nitro-phosphate fertilizer plant, having 12% moisture was dried to a moisture content of <1% in a rotary dryer. The dried calcium carbonate-rich by-product was fed at the rate of 5 kg/h into a rotary calciner. The calciner was preheated to 950° C. with an angle of inclination of 1.08 degrees and a shell rotation speed of 0.50 RPM. The hold-up time was 90 minutes and the outlet rate was 1.7 kg/h. The calcined mass obtained was found to have 88% available CaO. The calcined material was crushed into small lumps. The crushed calcined material was subjected to slaking for a period of one hour in a slaker so as to obtain a suspension having about 20% by weight solids. The suspension was wet sieved through a 100 mesh sieve to remove grit particles and diluted to obtain a slurry containing about 10% solids. This slurry was subjected to carbonation by passing a carbon dioxide-air mixture containing 25% by volume carbon dioxide through the slurry at a superficial gas velocity of about 12.5 cm/sec. The temperature of the carbonation was maintained in the range from 25 to 45° C., until the pH of the suspension dropped to neutral. The carbonation was completed within 90 minutes. Thereafter, the product was recovered by known methods. The product contained about 98% calcium carbonate, with a bulk density of about 0.42 g/mL and an average particle size in of about 6 microns with 100% of the particles having a particle size less than 20 microns.

EXAMPLE 4

A calcium carbonate-rich by-product generated in a nitro-phosphate fertilizer plant, having 12% moisture was dried to a moisture content of <1% in a rotary dryer. The dried calcium carbonate-rich by-product was fed at the rate of 10 kg/h into a rotary calciner. The calciner was preheated to 950° C. with an angle of inclination of 1.08 degrees and a shell rotation speed of 0.50 RPM. The hold-up time was 90 minutes and the outlet rate was 4.08 kg/h. The calcined mass obtained was found to have 88% available CaO. The calcined material was crushed into small lumps. The crushed calcined material was subjected to slaking for a period of one hour in a slaker so as to obtain a suspension having about 20% by weight solids. The suspension was wet sieved through a 100 mesh sieve to remove grit particles and then diluted to obtain a slurry containing about 10% solids. This slurry was subjected to carbonation by passing a carbon dioxide-air mixture containing 25% by volume carbon dioxide through the slurry at a superficial gas velocity of about 12.5 cm/sec. The temperature of the carbonation was maintained in the range from 25 to 45° C. until the pH of the suspension dropped to neutral. The carbonation was completed within 90 minutes. Thereafter, the product was recovered by known methods. The product contained about 98% calcium carbonate, with a bulk density of about 0.42 g/mL and an average particle size of about 6 microns with 100% of the particles having a particle size of less then 20 microns.

EXAMPLE 5

A calcium carbonate-rich by-product generated in nitro-phosphate fertilizer plant, having 23% moisture was dried to a moisture content of <1% in a rotary dryer. The dried calcium carbonate-rich by-product was fed at the rate of 10 kg/h into a rotary calciner. The calciner was preheated to 950° C. with an angle of inclination of 1.08 degrees and a shell rotation speed of 0.50 RPM. The hold-up time was 90 minutes and the outlet rate was 4.18 kg/hr. The calcined mass obtained was found to have 88% available CaO. The calcined material was crushed into small lumps. The crushed calcined material was subjected to slaking for a period of one hour in a slaker so as to obtain a suspension having about 20% by weight solids. The suspension was wet sieved through a 100 mesh sieve to remove grit particles and then diluted to obtain a slurry containing about 10% solids. This slurry was subjected to carbonation by passing a carbon dioxide-air mixture containing 25% by volume carbon dioxide through the slurry at a superficial gas velocity of about 12.5 cm/sec. The temperature of the carbonation was maintained in the range from 25 to 45° C., until the pH of the suspension dropped to neutral. The carbonation was completed within 90 minutes. Thereafter, the product was recovered by known methods. The product contained about 98% calcium carbonate, with a bulk density of about 0.42 g/mL and an average particle size of about 6 microns with a maximum particle size of less then 20 microns.

EXAMPLE 6

Pre-dried calcium carbonate-rich by-product having a particle size in the range from 20 to 150 microns and a moisture content of <1%, was introduced into a Fluidized Bed Calciner at the rate of 10 kg/h. A fluidized bed was formed by passing hot air through the calciner tower at a lower gas velocity of about 100 cm/sec. The temperature of calcination was maintained at around 950° C. by injecting fuel at a controlled rate. Within 60 minutes the desired calcined mass having 88% available CaO was obtained at the outlet rate of 5.7 kg/h. The calcined material was subjected to slaking for a period of one hour in a slaker so as to obtain a suspension having about 20% by weight solids. The suspension was wet sieved through a 100 mesh sieve to remove grit particles and diluted to obtain a slurry containing about 10% solids. This slurry is subjected to carbonation by passing through the slurry a carbon dioxide-air mixture containing 25% by volume carbon dioxide at a superficial gas velocity of about 12.5 cm/sec. The temperature was maintained in the range from 25 to 45° C., until the pH of the suspension dropped to neutral. The carbonation was completed within 90 minutes. Thereafter, the product was recovered by known methods. The product contained about 98% calcium carbonate, with a bulk density of about 0.42 g/ml and an average particle size of about 6 microns with a maximum particle size of less then 20 microns.

EXAMPLE 7

A by-product calcium carbonate with 1% moisture was calcined at 950° C. in a rotary calciner for 90 minutes to obtain 88% active calcium oxide. The calcined material was crushed to small lumps using a jaw crusher and cooled to below 50° C. using a water circulated jacketed screw conveyer-type material cooler. Seven kg. of this material was added to 35 liters of water in a 50 liter capacity slaker. The slaker was provided with a paddle type agitator which was operated at a maximum speed of 120 RPM to obtain a 20% weight by volume slurry. The reaction was found to be exothermic with a maximum rise in temperature of about 40° C. The slurry was continuously agitated for one hour so as to achieve complete conversion of calcium oxide to calcium hydroxide. This slurry was subjected to carbonation by passing a carbon dioxide-air mixture containing 25% by volume carbon dioxide through the slurry at a superficial gas velocity of about 12.5 cm/sec. The temperature of the carbonation was maintained in the range from 25 to 45° C., until the pH of the suspension dropped to neutral. The carbonation was completed within 90 minutes. Thereafter, the product was recovered by known methods. The product contained about 98% calcium carbonate, with a bulk density of about 0.42 g/mL and an average particle size of about 6 microns with a maximum particle size of less then 20 microns.

EXAMPLE 8

A by-product calcium carbonate with 1% moisture was calcined at 950° C. in a rotary calciner for 90 minutes to obtain 88% active calcium oxide. The calcined material was crushed to small lumps using a jaw crusher and cooled to below 50° C. using a water circulated jacketed screw conveyer-type material cooler. The crushed calcined material was further pulverized to −150 mesh powder. The pulverized material (7 kg) was added to 35 liters of water in a 50 liter capacity slaker provided with a paddle type agitator. The slaker was operated at a maximum speed of 120 RPM to obtain a slurry containing 20% weight by volume. The slurry was continuously agitated for one hour so as to achieve complete conversion of calcium oxide to calcium hydroxide. The reaction was found to be exothermic with maximum rise in temperature of about 40° C. This slurry was subjected to carbonation by passing a carbon dioxide-air mixture containing 25% by volume carbon dioxide through the slurry at a superficial gas velocity of about 12.5 cm/sec. The temperature of the carbonation was maintained in the range from 25 to 45° C., until the pH of the suspension dropped to neutral. The carbonation was completed within 90 minutes. Thereafter, the product was recovered by known methods. The product contained about 98% calcium carbonate, with a bulk density of about 0.42 g/mL, an average particle size of about 6 microns and a maximum particle size of less then 20 microns. This indicated that there was no advantage in using a powdered calcined mass as compared to using a calcined mass crushed into small lumps in the slaking process.

EXAMPLE 9

Seventy liters of a slaked lime slurry having about 20% solids was prepared under conditions similar to those described in Example-7. The slurry was transferred to a jacketed carbonation reactor consisting of a bubble column provided with a sparger specially designed to create sufficient turbulence for continuous mixing within the column. The reactor was further provided with arrangements for monitoring the reaction temperature and the pH and cooling/heating arrangements using the jacket provided. The carbonation was completed within 90 minutes by passing a $CO_2$-air mixture containing 25 volume % $CO_2$ at a superficial gas velocity of about 12.5 cm/sec. The carbonation temperature was maintained in the range from 25 to 45° C. A sufficient amount of the gas mixture was passed through the slurry to bring the pH of the slurry to neutral. When no further increase in pH (more than 7) was observed, the carbonation was stopped. The precipitated calcium carbonate formed in the carbonation was isolated by filtration, followed by washing, drying and pulverizing. The product contained about 98% calcium carbonate, with a bulk density in the range from 0.40–0.45 g/mL, an average particle size of about 6 microns and a maximum particle size of less than 20 microns.

EXAMPLE 10

A slurry of precipitated calcium carbonate obtained as described in Example-7, was heated to 95° C. with continuous agitation. To this slurry was added an emulsion of a fatty acid derivative such as stearic acid with caustic soda, in an amount of 3.5% by weight of the calcium carbonate to be produced. The slurry was allowed to cool to 40–45° C. with stirring to obtain a coated product. The coated product was isolated by filtration, followed by washing, drying and pulverizing. The properties of this coated precipitated calcium carbonate are provided in Table 1.

EXAMPLE 11

A slurry of precipitated calcium carbonate obtained as described in Example-7, was heated to 95° C. with continuous agitation. To this slurry was added an emulsion of a fatty acid derivative such as stearic acid with caustic soda, in an amount of 2.0% by weight of the calcium carbonate to be produced. The resulting slurry was allowed to cool to 40–45° C. with stirring to obtain a coated product. The coated product was isolated by filtration, followed by washing, drying and pulverizing. The total content of fatty acid derivative in the coated product was 1.6% by weight. Other properties of the product were similar to those provided in Table 1.

EXAMPLE 12

A by-product calcium carbonate with 1% moisture was calcined at 950° C. in a rotary calciner for 90 minutes to obtain 88% active calcium oxide. The calcined material was crushed to small lumps using a jaw crusher and cooled to below 50° C. using water circulated jacketed screw conveyer-type material cooler. Seven kg. of the crushed material was added to 35 liters of water in a 50 liter capacity slaker. The slaker was provided with a paddle type agitator. The slaker was operated at maximum speed of 120 RPM to obtain a 20% weight by volume slurry. The reaction was found to be exothermic with maximum rise in temperature of about 40° C. The slurry was continuously agitated for one hour so as to achieve complete conversion of calcium oxide to calcium hydroxide. This slurry was subjected to carbonation by passing a carbon dioxide-air mixture containing 25% by volume carbon dioxide through the slurry at a superficial gas velocity of about 15.0 cm/sec. The carbonation temperature was maintained in the range from 25 to 45° C., until the pH of the suspension dropped to neutral. The carbonation was completed within 75 minutes. Thereafter, the product was recovered by known methods. The product contained about 97% calcium carbonate, with a bulk density of about 0.45 g/mL, an average particle size of about 7 microns and a maximum particle size of less then 25 microns.

EXAMPLE 13

A by-product calcium carbonate with 1% moisture was calcined at 950° C. in a rotary calciner for 90 minutes to obtain 88% active calcium oxide. The calcined material was crushed to small lumps using a jaw crusher. The crushed material was cooled to below 50° C. using a water circulated jacketed screw conveyer-type material cooler. Seven kg. of the crushed material was added to 35 liters of water in a 50 liter capacity slaker. The slaker was-provided with a paddle type agitator. The slaker was operated at a maximum speed of 120 RPM to obtain a 20% weight by volume slurry. The reaction was found to be exothermic with maximum rise in temperature of about 40° C. The slurry was continuously agitated for one hour so as to achieve maximum conversion of calcium oxide to calcium hydroxide. The resulting slurry was subjected to carbonation by passing a carbon dioxide-air mixture containing 25% by volume carbon dioxide through the slurry at a superficial gas velocity of about 10.0 cm/sec. The carbonation temperature was maintained in the range from 25 to 45° C., until the pH of the suspension dropped to neutral. The carbonation was completed within 140 minutes. Thereafter, the product was recovered by known methods. The product contained about 97% calcium carbonate, with a bulk density of about 0.45 g/mL, an average particle size of about 7 microns and a maximum particle size of less then 25 microns.

EXAMPLE 14

A slaked lime slurry was obtained as described in Example-7. The slaked lime slurry was diluted to 10% wt/vol. of CaO and taken in a continuous stirred tank reactor equipped with an agitator, having height/diameter ratio of about 2. The slurry was kept continuously agitated at 100 RPM. A mixture of $CO_2$ and air in a ratio of 30 to 70 and a space velocity of 2 cm/sec was introduced at ambient temperature. The reaction pH was found to come to neutral towards the completion of carbonation within 50 minutes. When the gas flow was stopped the pH continued to rise up to 8.0. The carbonation was continued for further 10 minutes to obtain a steady pH of 7.0. A solid product was isolated, dried and pulverized to obtain a precipitated calcium carbonate and a coated product as described in Example 10. The properties of the coated precipitated calcium carbonate thus obtained were the same as the properties provided in Table 1.

Advantages of the present invention include
1. Calcium carbonate-rich by-product generated in industrial processes, specifically in nitrophosphate fertilizer plants, is converted to precipitated calcium carbonate by calcination, slaking and carbonation using conventionally used machinery.
2. A calcium carbonate-rich by-product is converted to value-added material suitable for applications in rubber, paint, PVC and plastics manufacture.
3. An alternative source to limestone is provided for producing precipitated calcium carbonate useful for commercial applications is disclosed.
4. A calcium carbonate-rich by-product having a fine particle size from 20 to 150 microns is successfully treated without contributing to pollution, due to dusting, which is commonly associated with such fine powders.
5. A continuous process is provided according to the present invention, which can be linked to the plant generating the calcium carbonate-rich by-product. This linked process can minimize the solid waste pollution caused by such by-products and improve the environmental quality of a nitrophosphate fertilizer plant.
6. Because the temperature of calcination of a calcium carbonate-rich by-product is around 950° C., special types of construction materials are not required to be used in the calciner.
7. Calcination according to the present invention provides the special advantage of removing all the major impurities simultaneously and converting the calcium carbonate-rich by-product to active calcium oxide. Therefore, few unit operations are required in claimed purification process.

We claim:
1. A process for the production of precipitated calcium carbonate from a calcium carbonate-rich by-product of an industrial processes, the claimed process comprising:
    (a) continuously feeding a wet calcium carbonate-rich by-product into a calciner to generate calcined material; wherein the calcium carbonate-rich by-product:
        contains up to 25% moisture,
        has a particle size from 20 to 150 microns, and
        is fed to the calciner at a feed rate from about 5 to 20 kg/h; and
    wherein the calciner
        is maintained at a temperature from 850° C. to 950° C.,
        has an angle of inclination of about 1.08 degrees, and
        has a shell rotation speed from 0.5 to 2.0 RPM;
    (b) routing water vapor, carbon dioxide, ammonia and $NO_x$ gas liberated from the calcium carbonate-rich by-product in the calciner to a scrubber, wherein ammonia and NOx gasses are scrubbed with water;
    (c) after a residence time in the calciner from 30 to 90 minutes, outputting the calcined material at a rate from 2.0 to 10.0 kg/hour to a crusher;
    (d) crushing the calcined material into small lumps using said crusher;
    (e) cooling the small lumps to near ambient temperature in a cooler;
    (f) slaking the cooled lumps with water in a slaker provided with an agitator rotating at a maximum speed of 120 RPM to produce a hydrated lime slurry having a solids content from 15 to 23% by weight;
    (g) removing heavy particles from the hydrated lime slurry by sedimentation, by wet sieving through a 60 to 100 mesh sieve, or by both sedimentation and wet sieving;
    (h) diluting the slurry with water to a solids content in the range from 10 to 20% by weight;
    (i) feeding the diluted slurry to a carbonation reactor and subjecting the slurry to a carbonation reaction wherein a carbon dioxide—air mixture containing from 25 to 75% by volume carbon dioxide is passed through the slurry at a superficial gas velocity from 10 to 15 cm/sec;

(j) maintaining the slurry in the carbonation reactor at a temperature in the range from 25 to 45° C. until the pH of the slurry becomes neutral;

(k) separating solids precipitated from the carbonation reaction; and (l) drying and pulverizing the separated solids to obtain precipitated calcium carbonate having a purity of greater than 97%, a brightness of greater than 96%, a bulk density of 0.40 to 0.65 g/mL and an average particle size of about 5 to 20 microns, wherein 100% of the particles are less than 20 microns.

2. A process according to claim 1, wherein the precipitated material is separated in step (k) by filtration or centrifugation.

3. A process according to claim 1, further comprising prior to step (k), the step of: treating the slurry with an emulsion of fatty acid derivative to obtain a slurry of coated calcium carbonate.

4. A process according to claim 1, wherein the small lumps formed in step (d) are cooled to a temperature from 40° to 50° C.

5. A process according to claim 1,
wherein step (f) comprises continuous agitation for up to one hour at 120 RPM to convert calcium oxide to calcium hydroxide.

6. A process according to claim 1, wherein the carbon dioxide—air mixture in step (i) comprises 25% carbon dioxide in air and the carbonation reactor is provided with a purger.

7. A process according to claim 1, wherein the slurry in the carbonation reactor is maintained at a temperature from 30 to 45° C. until the pH of the slurry becomes neutral.

* * * * *